United States Patent [19]
Carlsen

[11] 4,300,328
[45] Nov. 17, 1981

[54] EASILY REMOVABLE HEAT RECOVERABLE CLOSURE

[75] Inventor: John S. Carlsen, Palo Alto, Calif.

[73] Assignee: Raychem Corporation, Menlo Park, Calif.

[21] Appl. No.: 59,193

[22] Filed: Jul. 20, 1979

[51] Int. Cl.³ .................. B65B 43/26; B65B 61/18; H02G 15/02; B65D 73/02

[52] U.S. Cl. .................. 53/492; 53/397; 53/412; 29/235; 29/426.4; 29/762; 156/86; 174/74 A; 174/10; 174/DIG. 8; 206/329; 206/331; 206/616; 220/267; 428/35; 428/36

[58] Field of Search .............. 174/10, 74 A, DIG. 8; 428/35, 36; 206/616, 329, 331; 156/86; 29/235, 426.4, 762; 53/397, 412, 492; 220/267

[56] References Cited
U.S. PATENT DOCUMENTS

| | | | |
|---|---|---|---|
| 2,147,337 | 2/1939 | Charmoy | 156/56 |
| 3,029,932 | 4/1962 | Layne | 156/185 |
| 3,243,211 | 3/1966 | Wetmore | 205/21 |
| 3,297,819 | 1/1967 | Wetmore | 156/48 |
| 3,352,480 | 11/1967 | Forman | 206/616 |
| 3,379,218 | 4/1968 | Conde | 285/381 |
| 3,456,780 | 7/1969 | Forman | 206/616 |
| 3,515,798 | 6/1970 | Sievirt | 29/235 |
| 3,946,480 | 3/1976 | Dienes | 29/235 |
| 4,142,592 | 3/1979 | Brusselmans | 156/86 |

Primary Examiner—William R. Dixon, Jr.
Attorney, Agent, or Firm—Lyon & Lyon

[57] ABSTRACT

An easily removable heat-recoverable closure assembly for a substrate includes a heat-recoverable closure and a flexible wire to be interposed between the closure and the substrate. The wire has sufficient flexibility and sufficient strength that it can be pulled through the wall of the closure for removal of the heat-recovered closure from the substrate.

35 Claims, 3 Drawing Figures

EASILY REMOVABLE HEAT RECOVERABLE CLOSURE

BACKGROUND

The present invention relates to the field of heat-recoverable closure assemblies for elongate substrates and more particularly to preconnectorized cable closure systems.

Various methods of sealing preconnectorized cable closures have been devised in the prior art. The simplest method involves wrapping several plastic bags around the preconnectorized cable end and taping the junction of the bag and the cable. However, the cables are wound and unwound from large drums, and large stresses are placed on the junction between the bags and the cable. In the plastic bag arrangement, neither tape nor adhesive can dependably withstand these stresses without leaking. Broken connectors caused by the lack of a physical protection have caused lost time and money making repairs in the field.

A heat-recoverable molded closure was devised that was both sturdy and leakproof. This closure is described in co-pending and co-assigned U.S. Pat. application Ser. No. 849,425 filed Nov. 7, 1977 by Bruce D. Campbell, and entitled "Heat-Recoverable Articles", which application is incorporated by reference herein. As described in the application, preconnected cable is placed within the molded container which has a heat-recoverable neck which is recovered about the cable to form a watertight seal with substantial mechanical durability and strain relief. The molded closure arrangement works well until removal of the closure is necessary. The closure material is so strong that a knife and hammer are necessary to cut through the neck of the closure. This is time consuming and often results in damage to the underlying cable jacket.

To overcome the problem of damage to the underlying cable jacket, a metal shield has been placed between the cable jacket and the heat-recoverable portion of the closure. This is described in co-assigned and co-pending U.S. Pat. application Ser. No. 908,976 filed on May 24, 1978 by Bruce D. Campbell, which application is incorporated herein by this reference. Although this arrangement solves the problem of damage to the underlying cable jacket, removal of the closure is still time consuming. In addition, application of the metal shield can be both time consuming and difficult.

Therefore, there is need for a heat-recoverable closure assembly for cables and other substrates which provides a moisture proof closure and which is applied easily and can be removed easily without damage to the substrate.

Summary

The present invention is directed to such an easily removable heat-recoverable closure assembly. The closure assembly comprises a heat-recoverable closure such as an end cap to be disposed about an exterior portion of a substrate and a flexible wire. The flexible wire is to be interposed between the heat-recoverable closure and the substrate along the length of the substrate. The wire has sufficient flexibility and sufficient strength that it can be pulled through the wall of the closure for removal of the heat-recoverable closure from the substrate. Preferably, the wire has an elastic modulus of at least about $25 \times 10^6$ psi.

Preferably the closure assembly includes anchor means such as a crimp sleeve secured to the wire. The purpose of the anchor is to keep the wire from slipping relative to the closure when the wire is pulled. When removing the closure from the substrate, the closure can be notched adjacent to the anchor so that the anchor can catch in the notch.

The closure assembly is easy to apply to a substrate. All that is necessary is to place the wire adjacent to the portion of the substrate to be covered by the heat-recoverable closure, where at least a portion of the wire extends along the length of the substrate. Then the heat-recoverable closure is heat-recovered over the wire and substrate.

To remove the closure, the wire is exposed by cutting away a portion of the closure. Then the wire is gripped by a tool such as needlenose pliers, and pulled through the closure, resulting in a clean, smooth cut of the closure without any damage to the substrate.

DRAWINGS

These and other features, aspects, and advantages of the present invention will become better understood with reference to the following description, appended claims, and accompanying drawings where:

DESCRIPTION

Figure 2:
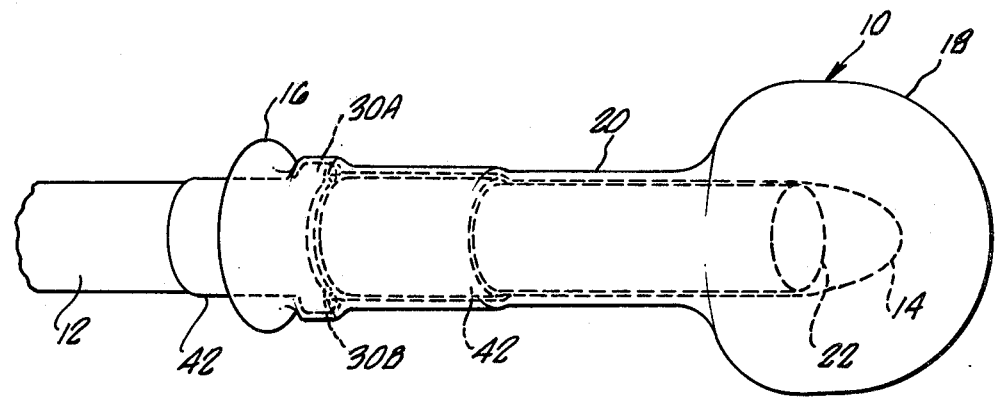
FIG. 2 shows the cable of FIG. 1 with a closure assembly according to the present invention mounted thereon.
Figure 3:
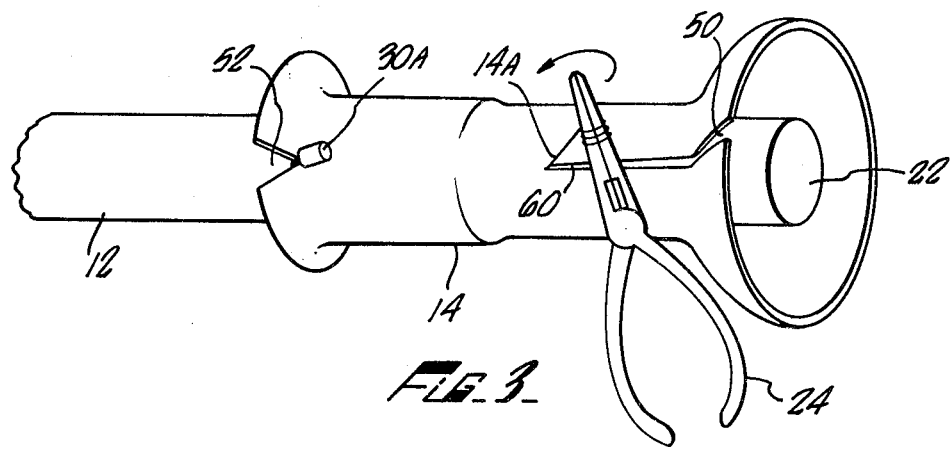
FIG. 3 shows the closure assembly of FIG. 2 being removed from the cable.

The present invention is directed to an easily removable closure assembly for sealing around elongate substrates such as telephone and electrical cables. The main components of the closure assembly are a heat-recoverable closure and a wire. With reference to the figures, the closure 10 shown in FIG. 2 is heat-recovered about the exterior portion of the cable 12 with the flexible wire 14 interposed between the cable and the closure.

Preferably the closure is a tubular end cap such as described in the aforementioned Campbell application Ser. No. 849,425. With such a cap, the open end section 16 and the closed end section 18 each have a larger circumference after unrestrained recovery than the adjacent intermediate section 20. Such a cap is especially useful for encapsulating the termination of the multi-wire telephone cable 12.

The present invention is especially applicable to heat-shrinkable closures made from materials, especially plastics materials, possessing the property of elastic or plastic memory. However, it can be usefully applied to other forms of heat-recoverable articles, including heat-expandable articles.

The heat-recoverable closure generally has a closed cross-section, although, in some instances, the invention may usefully be used with to so-called wrap-around devices of the sort described in, for example, U.S. Pat. Nos. 3,243,211, 3,297,819 and 3,379,218 and British Pat. Nos. 1,155,470, 1,211,988 and 1,346,479, all of which patents are incorporated herein by this reference. The closure is commonly tubular, having one or more open ends, the term "tubular" including both hollow cylindrical closures and closures of irregular and/or varying cross-section as well as those of more complex configuration such as Y-shaped, T-shaped and X-shaped members having 3 or 4 ends.

The heat-recoverable closure of the present invention can be prepared from any of the polymers and mixtures of polymers known from the prior art to be useful for the production of heat-recoverable closures. Generally the closure is monolithic and of constant composition throughout; however, laminates of two heat-recoverable polymers can be used, and the closure can be constructed by joining together, e.g. with adhesive, two or more different parts. Suitable polymers include polyolefins, especially polyethylene; copolymers of ethylene and vinyl acetate, (which are particularly valuable when flexibility is required), copolymers of ethylene and ethyl acylate; chlorinated or fluorinated polymers, especially polyvinyl chloride, polyvinylidene fluoride and polymers incorporating units derived from polyvinylidene fluoride, hexafluoroethylene and chlorotrifluoroethylene; and rubbers such as ethylenepropylene rubber, chlorinated rubbers (Neoprene) and silicone rubbers which may be used in a blend with a crystalline or glassy polymer such as an olefin polymer.

Preferably, the internal surface of the closure is provided with a sealant such as a hot melt adhesive or a mastic. Especially suitable hot-melt adhesives include, for example, polyamide materials, ethylene/vinyl acetate copolymers and terpolymers (with or without incorporated waxes) and polyesters. Such materials are described, for example, in British Pat. No. 1,440,810 and German OS No. 2 709 717, both of which are incorporated herein by this reference. Also suitable are curable adhesives which also melt and flow upon heating, but which will not afterwards be hot-meltable. There may also be mentioned epoxy resins and conventional mastics such as, for example, those based on butyl and isobutylene rubbers modified with suitable materials known in the art. The type of sealant employed and the method of its application depends on the particular requirements in any given case.

If the thickness of the wall of the closure is very low, a leak path can develop at the interface between the closure and the wire. Thus, it is necessary for the closure to have a wall sufficiently thick that such a leak path can not form. On the other hand, if the closure is too thick, it is very difficult to pull the wire 14 through the closure. Preferably the wall thickness of the closure is from about 30 to about 180 mils, to avoid leakage and to allow the wire 14 to be pulled through the closures.

The wire 14 needs to be both flexible and strong. As shown in the figures, the wire needs to be sufficiently flexible that it can be looped around the end 22 of the cable 12 without breaking. It also needs to be sufficiently flexible that it can be bent by a hand tool such as a pair of needlenose pliers 24 and wrapped around the pliers while it is being pulled to cut through the closure. The wire needs to be sufficiently strong that it does not break when it is being pulled to cut through the closure. The requirements are satisfied by a wire having an elastic (Young's) modulus of at least about $25 \times 10^6$ psi as determined by ASTM Test Method E-111. The preferred material for the wire is steel piano wire. Materials such as aluminum, copper, and nichrome are too weak to be used as part of the closure assembly of the present invention.

The thickness of the wire is important for the closure assembly to be easily removable. If the wire is too thin, it can break when being pulled. However, if the wire is too thick, so much force can be required during the pulling process that it can break at a stress point or it can slip relative to the closure, and thus not cut through the closure. The wire thickness depends on the material used for the heat-recoverable closure and the wall thickness of the closure. As the stiffness and the thickness of the closure wall increase, a stronger, and thus a wire with a larger diameter, is required. Generally, the wire needs to have a diameter of from about 10 to about 65 mils, and when the closure is made of high density polyethylene, preferably the wire is from about 25 to about 40 mils in diameter.

The closure assembly is applied to the cable 12 by placing the heat-recoverable closure about an exterior portion of the cable and placing the flexible wire 14 along an exterior portion of the cable interposed between the closure and the cable. The closure is then heat-recovered about the cable. The wire can be placed along the cable either before, during or after the closure is placed about the cable.

More than one wire can be used in a closure assembly. Preferably, as shown in the figures, a single wire 14 is used. When the closure is an end cap, preferably the wire is looped about the end 22 of the cable, resulting in two sections 14A and 14B extending along the length of the cable substantially parallel to the longitudinal axis of the cable. This has the advantage that if one section of the wire breaks during removal of the closure, then the other section can be pulled upon for removing the closure. Preferably the wire 14 is looped around the substrate so that the two sections 14A and 14B are on substantially opposite sides of the cable. This allows workmen to have easy access to the wire, even if a cable is mounted against a wall or other object.

Figure 1:
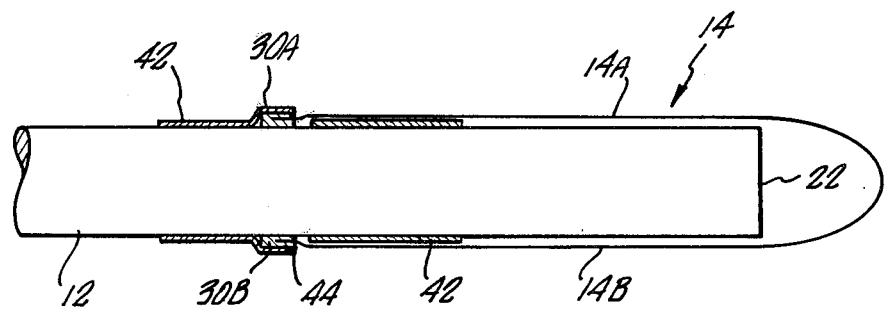
FIG. 1 shows a multi-wire telephone cable with a flexible wire positioned thereon in accordance with principles of the present invention.

In a preferred version of the present invention, the closure assembly also includes anchoring means 30 which are secured to the wire. The purpose of the anchoring means is to keep the wire from slipping relative to the closure when the wire is pulled. The anchoring means can be a crimp barrel which is crimped on the ends of the wire. As shown in FIG. 1, crimp barrels 30A and 30B are crimped to the ends of wire sections 14A and 14B, respectively. The anchoring means need to have a sufficiently large outer diameter to perform their anchoring function. Thus, preferably the anchoring means have an outer diameter from about $\frac{1}{8}$ to about $\frac{1}{2}$ inch, and more preferably about $\frac{1}{4}$ inch.

In the version of the invention shown in the figures, the cable is partially wrapped with aluminum tape 42. The tape 42 is interposed between the wire and the cable, except adjacent to the anchors were the aluminum tape is flared to form a pocket 44 for holding the anchors in place.

The closure assembly, which comprises the heat-recoverable closure, the wire, and the anchors can be provided to the craftsman in three different configurations. In the first configuration, each of the components is supplied separately to be assembled in the field. In the second configuration, the anchors are secured to the wire. In the third configuration, the anchors are secured to the wire and the wire is preplaced within the closure.

Removal of the closure assembly from the cable 12 can be accomplished quickly and easily. In a first step, the closed end section 18 of the cap 10 is cut away to expose the looped wire 14 and the end 22 of the cable. The wire is then cut at the loop. Two notches are then cut in the closure assembly. A first notch 50 is cut adjacent to the looped end of the wire and a second notch 52 is cut in the expanded open end section of the end cap 10 adjacent to the anchors. The first notch 50 provides a starting point for the wire. The second notch 52 provides a place for the anchor 38 to be caught to stop slippage of the wire section 14A as it is pulled through the closure. In addition, because the open end section 16 is spaced apart from the outer surface of the substrate, without the second notch 52, it would be difficult to cut through that portion of the closure.

After the wire is cut, the needlenose pliers 24 are used to grip section 14A of the wire and the wire is pulled through the closure making a cut 60. The wire is pulled until the closure is cut completely along its length, allowing it to be removed easily from the cable 12. Preferably the wire is pulled by wrapping it around the pliers 24 to obtain the mechanical advantage of wrapping.

These and other features of the present invention will become better understood with reference to the following example.

Example

Eleven samples of closure assemblies were made, aged, and tested. The types of closure assemblies used are presented in Table 1. All of the caps were made of high density polyethylene, having a wall thickness of either 125 mils or 90 mils. For some samples, adhesive or mastic material or a sealant was used between the cap and the cable. The closure assemblies were placed on a cable in the configuration shown in FIGS. 1 and 2. The wire used was 25 inch long steel wire having a diameter of 24 mils. The heating time used to recover the closure about the cable and to activate the hot-melt adhesive is also reported in Table 1. The heating was conducted at 400° F. The anchors used were crimp barrels having an outer diameter of ¼ inch.

The closure assemblies were subjected to an aging cycle as described in Table 1. Before beginning aging, and periodically during aging, the samples were pressure tested at 10±0.5 psi, static, measured at 23° C. Sample 7 leaked after 35 cycles and sample 8 leaked after 15 cycles. Since these were the only two samples that did not have a sealant between the cap and the cable, this indicates that the presence of a sealant between the cap and the cable is important in maintaining a hermetic seal.

More than one assembly of each type of sample was made. At least one type of each sample has been successfully tested to demonstrate that by pulling the wire, the cap can be removed easily from the cable.

The aging tests are currently underway, and where a number is presented with a "+" in Table 1, it indicates that the closure has not yet leaked.

The closure assembly of the present invention has many advantages. It is inexpensive, and easily can be placed on a cable and easily removed from a cable. It provides a moisture proof enclosure, and is relatively craft insensitive. The closure can be removed without damage to the cable. It provides a safe, inexpensive, and moisture proof closure for telephone cables.

Although the present invention has been described in considerable detail with reference to certain versions thereof, other versions are possible. For example, instead of pulling from the end of a cable, the wire can be pulled from the midportion of the cable towards the end, with the anchors provided at the end of the cable. Also, the wire 14 need not be made of steel, but it can be made of synthetic materials and other metals and alloys which satisfy the requirements set forth above. Therefore, the spirit and scope of the appended claims should not necessarily be limited to the description of the preferred versions contained herein.

TABLE 1

| Sample | Heating Time (minutes) | Wall Thickness (mils) | Sealant | Cycles[2] |
|---|---|---|---|---|
| 1 | 2[1] | 125 | S-1051 adhesive[3] | 45+ |
| 2 | 2 | 125 | S-1051 adhesive[3] | 45+ |
| 3 | 2 | 90 | S-1051 adhesive[3] | 45+ |
| 4 | 2 | 90 | S-1051 adhesive[3] | 45+ |
| 5 | 2 | 90 | S-1051 adhesive[3] | 45+ |
| 6 | 2 | 90 | None | 35 |
| 7 | 2[1] | 90 | None | 15 |
| 8 | 4 | 90 | S-1076 mastic[4] | 45+ |
| 9 | 2½ | 90 | S-1076 mastic[4] | 45+ |
| 10 | 2½ | 90 | S-1017 adhesive[5] | 32+ |

[1]Air leakage upon initial pressurization, additional 3½ minutes reheating was used.
[2]A cycle consisted of 4 hours at 60° C., 2 hours transition, 4 hours at −40° C., 2 hours transition.
[3]S-1051 adhesive is a thermoplastic polyethylene copolymer based hot-melt adhesive having a "tack" point of about 230–280° F. available from Raychem Corp. of Menlo Park, California.
[4]S-1076 mastic is an elastomeric butyl rubber based mastic.
[5]S-1017 adhesive is a thermoplastic polyethylene based hot-melt adhesive having a "tack" point of about 200–250° F. available from Raychem Corp. of Menlo Park, California.

What is claimed is:

1. An article comprising:
   (a) an elongate substrate;
   (b) a heat recoverable closure disposed about an exterior portion of the substrate, the closure having a wall thickness of from about 30 to about 180 mils; and
   (c) a flexible wire interposed at least partially between the substrate and the closure along the length of the substrate, wherein the wire has (i) sufficient flexibility, (ii) sufficient strength with an elastic modulus of at least about $25 \times 10^6$ psi, and (iii) a diameter of from about 10 to about 65 mils that the wire can be pulled through the closure by cutting the wall of the closure for removing the closure from the substrate after the closure has been recovered on the substrate; and
   (d) anchoring means secured to the wire to keep an end of the wire from slipping relative to the closure when the wire is pulled.

2. The article of claim 1 in which the anchoring means comprises a crimp sleeve.

3. The article of claim 2 wherein the anchoring means has an outer diameter of at least about ⅛ inch.

4. The article of claim 1 in which the wire is looped about an end of the substrate so that the wire comprises two sections extending along the length of the substrate.

5. An article comprising:
   (a) an elongate substrate;
   (b) a heat recoverable closure disposed about an exterior portion of the substrate, the closure having a wall thickness of from about 30 to about 180 mils; and
   (c) a flexible wire interposed at least partially between the substrate and the closure along the length of the substrate, wherein the wire has (i) sufficient flexibility, (ii) sufficient strength with an elastic modulus of at least about $25 \times 10^6$ psi, and (iii) a diameter of from about 10 to about 65 mils that the wire can be pulled through the closure by cutting the wall of the closure for removing the closure from the substrate after the closure has been recovered on the substrate, wherein the wire is looped about an end of the substrate so that the wire comprises two sections extending along the length of the substrate.

6. The article of claim 5 in which the two sections are on substantially opposite sides of the substrate.

7. The article of claim 5 in which each section of the wire has anchoring means attached thereto to keep the ends of the wire from slipping relative to the closure when the wire is pulled.

8. The article of claim 1 or 5 in which the wire is piano wire.

9. The article of claim 1 or 5 in which the wire has a diameter of from about 25 to about 40 mils.

10. The article of claim 1 or 5 including a layer of adhesive juxtaposed a portion of the interior surface of the closure.

11. The article of claim 1 or 5 in which the closure is heat-recovered.

12. The article of claim 1 or 5 in which the closure is an end cap.

13. The article of claim 1 or 5 in which the wire is completely covered by the closure.

14. A waterproof closure assembly comprising:
(a) a cable;
(b) a heat-recoverable end cap disposed about an exterior portion of the cable at an end of the cable, the end cap having a wall thickness of from about 30 to about 180 mils;
(c) a layer of adhesive juxtaposed to at least a portion of the interior surface of the end cap;
(d) a steel wire interposed at least partially between the substrate and the closure along the length of the substrate, the wire having (i) sufficient flexibility, (ii) a sufficiently high elastic modulus of at least about $25 \times 10^6$ psi, and (iii) a diameter of from about 10 to about 65 mils so that it can be pulled through the wall of the closure by cutting the wall of the closure for removal of the closure from the cable; and
(e) anchoring means secured to the wire to keep an end of the wire from slipping relative to the closure when the wire is pulled.

15. The assembly of claim 14 in which the wire is completely covered by the end cap.

16. A closure assembly for covering an elongate substrate comprising
(a) a tubular heat-recoverable end cap to be disposed about an exterior portion of the substrate, the end cap having a wall thickness of from about 30 to about 180 mils, and
(b) a flexible wire in the interior of the end cap substantially parallel to the longitudinal axis of the end cap, the wire having (i) sufficient flexibility, (ii) sufficient strength with an elastic modulus of at least about $25 \times 10^6$ psi, and (iii) a diameter of from about 10 to about 65 mils that it can be pulled through the wall of the end cap by cutting the wall of the end cap for removal of the end cap from the substrate after the end cap is heat-recovered on the substrate, wherein the wire doubles back on itself at the closed end of the end cap so that the wire comprises two sections extending along the longitudinal axis of the end cap.

17. A closure assembly for covering an elongate substrate comprising (a) a heat recoverable closure to be disposed about an exterior portion of the substrate, the closure having a wall thickness of from about 30 to about 180 mils, (b) a flexible wire adapted to be interposed between the heat-recoverable closure and the substrate along the length of the substrate, wherein the wire has (i) sufficient flexibility, (ii) sufficient strength with an elastic modulus of at least about $25 \times 10^6$ psi, and (iii) a diameter of from about 10 to about 65 mils that it can be pulled through the wall of the closure by cutting the wall of the closure for removal of the closure from the substrate after the closure is heat-recovered on the substrate, and (c) anchoring means for attachment to the wire to keep an end of the wire from slipping relative to the closure when the wire is pulled.

18. A closure assembly for covering an elongate substrate comprising
(a) a tubular heat-recoverable closure to be disposed about an exterior portion of the substrate, the closure having a wall thickness of from about 30 to about 180 mils, and
(b) a flexible wire in the interior of the closure substantially parallel to the longitudinal axis of the closure, the wire having (i) sufficient flexibility, (ii) sufficient strength with an elastic modulus of at least about $25 \times 10^6$ psi, and (iii) a diameter of from about 10 to about 65 mils that it can be pulled through the wall of the closure by cutting the wall of the closure for removal of the closure from the substrate after the closure is heat-recovered on the substrate, the closure assembly also including anchoring means secured to the wire to keep an end of the wire from slipping relative to the closure when the wire is pulled.

19. The closure assembly of claim 18 including a heat activatable adhesive on the interior surface of the heat-recoverable closure.

20. A closure assembly for covering an elongate substrate comprising (a) a heat recoverable closure to be disposed about an exterior portion of the substrate, the closure having a wall thickness of from about 30 to about 180 mils, (b) a flexible wire adapted to be interposed between the heat-recoverable closure and the substrate along the length of the substrate, wherein the wire has (i) sufficient flexibility, (ii) sufficient strength with an elastic modulus of at least about $25 \times 10^6$ psi, and (iii) a diameter of from about 10 to about 65 mils that it can be pulled through the wall of the closure by cutting the wall of the closure for removal of the closure from the substrate after the closure is heat-recovered on the substrate, and (c) anchoring means secured to the wire to keep an end of the wire from slipping relative to the closure when the wire is pulled.

21. The closure assembly of claim 17 or 20 including a heat activatable adhesive on the interior surface of the heat-recoverable closure.

22. The closure assembly of claim 18 or 20 in which the closure is an end cap and the wire doubles back on itself at the closed end of the end cap so that the wire comprises two sections extending along the longitudinal axis of the end cap.

23. The closure assembly of claim 22 including anchoring means attached to each section of the wire.

24. The assembly of claim 17 or 20 in which the wire is completely covered by the closure.

25. The closure assembly of claim 20 including an anchor mounted on opposite ends of the wire.

26. A method for applying an easily removable closure to an elongate substrate comprising the steps of:
(a) placing a heat-recoverable closure having a wall thickness of from about 30 to about 180 mils about an exterior portion of the substrate;
(b) placing a flexible wire along an exterior portion of the substrate interposed between the closure and the substrate, at least a portion of the wire being substantially parallel to the longitudinal axis of the substrate, wherein the wire has (i) sufficient flexibility, (ii) sufficient strength with an elastic modulus of at least about $25 \times 10^6$ psi, and (iii) a diameter of from about 10 to about 65 mils that the wire can be pulled through the closure by cutting the wall of the closure when removing the closure from the substrate after the closure has been recovered on the substrate; and
(c) after the step of placing, heat-recovering the closure about the substrate.

27. A method for applying an easily removable closure to an elongate substrate comprising the steps of:
(a) placing a heat-recoverable closure having a wall thickness of from about 30 to about 180 mils about an exterior portion of the substrate;
(b) placing a single strand of flexible wire along an exterior portion of the substrate interposed between the closure and the substrate, the wire being looped about an end of the substrate so that the wire comprises two sections extending along the length of the substrate, at least a portion of the wire being substantially parallel to the longitudinal axis of the substrate, wherein the wire has (i) sufficient flexibility, (ii) sufficient strength with an elastic modulus of at least about $25 \times 10^6$ psi, and (iii) a diameter of from about 10 to about 65 mils that the wire can be pulled through the closure by cutting the wall of the closure when removing the closure from the substrate after the closure has been recovered on the substrate; and
(c) heat-recovering the closure about the substrate.

28. The method of claim 27 in which the wire is looped so that the two sections are on substantially opposite sides of the substrate.

29. The method of claim 27 including the step of securing anchoring means to each section of wire.

30. A method for applying an easily removable closure to an elongate substrate comprising the steps of:
(a) placing a heat-recoverable closure having a wall thickness of from about 30 to about 180 mils about an exterior portion of the substrate;
(b) placing a flexible wire along an exterior portion of the substrate interposed between the closure and the substrate, at least a portion of the wire being substantially parallel to the longitudinal axis of the substrate, wherein the wire has (i) sufficient flexibility, (ii) sufficient strength with an elastic modulus of at least about $25 \times 10^6$ psi, and (iii) a diameter of from about 10 to about 65 mils that the wire can be pulled through the closure by cutting the wall of the closure when removing the closure from the substrate after the closure has been recovered on the substrate;
(c) securing anchoring means to the wire to keep an end of the wire from slipping relative to the closure when the wire is pulled; and
(d) heat-recovering the closure about the substrate.

31. The method of claim 28 or 27 in which the heat-recoverable closure is placed about the wire so that when the closure is heat-recovered, the wire is completely covered by the closure.

32. A method for removing a closure assembly from an elongate substrate, the closure assembly comprising a heat-recovered end cap having a wall thickness of from about 30 to about 180 mils disposed about an exterior portion of the substrate at an end of the substrate, a strand of steel wire interposed at least partially between the substrate and the closure along the length of the substrate, the wire having a diameter of from about 10 to about 65 mils and being looped about an end of the substrate so that the wire comprises two sections extending along the length of the substrate, the wire having sufficient flexibility and a sufficiently high elastic modulus of at least about $25 \times 10^6$ psi that the wire can be pulled through the closure by cutting the wall of the closure for removing the closure from the substrate, the closure assembly including anchoring means secured to each section of the wire, the method comprising the steps of:
(a) removing the closed end of the end cap to expose the looped portion of the wire;
(b) cutting the strand of wire at the looped end to separate the two sections from each other;
(c) notching the cut end of the end cap; and
(d) pulling at least one of the wires through the closure starting at the notch.

33. A method for removing a closure assembly from an elongate substrate, the closure assembly comprising (a) a heat-recoverable closure having a wall thickness of from about 30 to about 180 mils disposed about an exterior portion of the substrate, (b) a flexible wire interposed at least partially between the substrate and the closure along a portion of the length of the substrate, wherein the wire has (i) sufficient flexibility, (ii) sufficient strength with an elastic modulus of at least about $25 \times 10^6$ psi, and (iii) a diameter of from about 10 to about 65 mils that the wire can be pulled through the closure by cutting the wall of the closure for removing the closure from the substrate, and (c) anchoring means secured to the wire at the end of the wire opposite the end to be pulled, the method comprising the steps of notching the closure adjacent the anchoring means and pulling an end of the wire through the closure, wherein the step of pulling comprises slipping the wire relative to the closure until the anchoring means is caught by the notch.

34. The method of claim 33 in which the step of pulling comprises gripping the wire with a tool and wrapping the wire around the tool.

35. The method of claim 33 including the step of notching the closure at the end adjacent the end of the wire wire about an end of the substrate so that the wire comprises two sections extending along the length of the substrate.

* * * * *